Nov. 20, 1923. 1,475,020
F. MAYER
DEVICE FOR DISTRIBUTING FLUID PRESSURE TO HYDRAULIC COUPLINGS
Filed Sept. 10, 1920
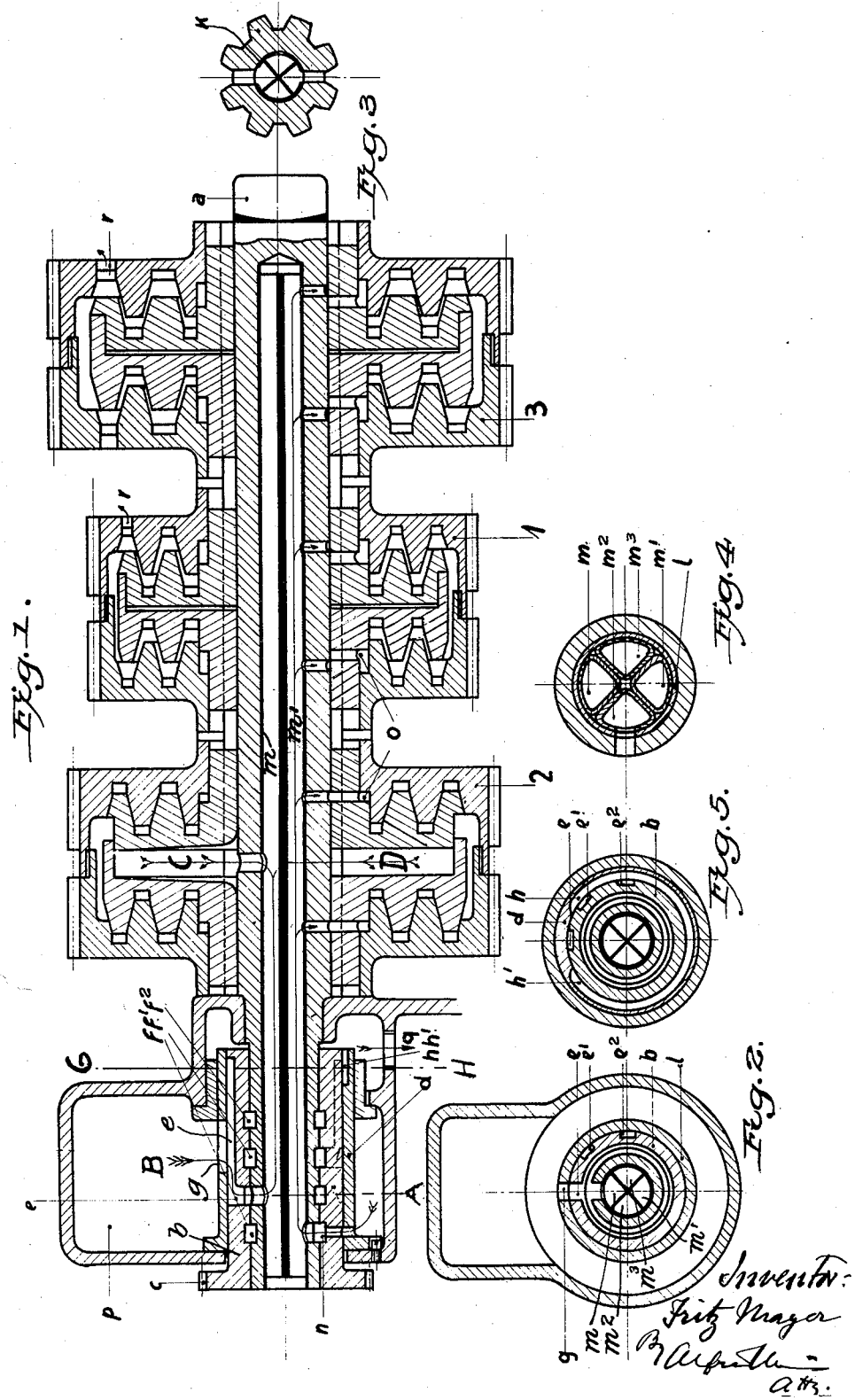

Patented Nov. 20, 1923.

1,475,020

UNITED STATES PATENT OFFICE.

FRITZ MAYER, OF ULM, GERMANY, ASSIGNOR, BY MESNE ASSIGNMENTS, TO JOHN KELLER, OF OBERLENNINGEN-TECK, WURTTEMBERG, GERMANY.

DEVICE FOR DISTRIBUTING FLUID PRESSURE TO HYDRAULIC COUPLINGS.

Application filed September 10, 1920. Serial No. 409,491.

*To all whom it may concern:*

Be it known that I, FRITZ MAYER, a citizen of Germany, residing at Ulm a/Donau, in the State of Bavaria, Republic of Germany, have invented certain new and useful Improvements in Devices for Distributing Fluid Pressure to Hydraulic Couplings, of which the following is a specification, reference being had therein to the accompanying drawing.

My invention relates to a device for distributing fluid pressure to hydraulic couplings for the purpose of obtaining, as much as practically possible, a direct feeding of pressure-oil to the said couplings thereby avoiding the use of stuffing-boxes and special pipe-conduits. A further object of my invention is, to reduce the length of construction of the hydraulic plant, and another object is to make the pressure-oil completely flow out from the couplings.

Heretofore, one has provided within the transmitting shaft pistons adapted to be axially displaced and connected by piping to the oil-reservoir, the axial displacement of said pistons acting to distribute the oil to the several couplings.

One has also distributed the pressure oil through cocks or valves connected to the casing independent of the transmitting shaft, said cocks or valves feeding the oil to the couplings by means of pipes or ducts cast into the casing, recourse being had, in such cases, to stuffing boxes.

These well-known constructions are objectionable because of their considerable length, being complicated and the use of stuffing-boxes which require constant observation.

These difficulties are removed by the present invention which consists in combining the oil-distributing device directly with the transmitting shaft in such a manner as to make it turn within the staionary casing of the distributor. The said stationary casing can automatically adjust itself in the radial direction, so that the shaft is not bent or does not vibrate under the action of the gearing.

In the accompanying drawing in which an embodiment of the distributing device of the invention is illustrated, Fig. 1 is a central longitudinal section of the invention. Fig. 2 is a cross-section along line A—B of Fig. 1. Fig. 3 is a cross-section along line C—D of Fig. 1. Fig. 4 is a cross-section through the hollow transmission shaft, showing a slight modification; and Fig. 5 is a cross-section along line G—H of Fig. 1.

Referring to the drawings, $a$ is the transmitting shaft carrying the three couplings 1, 2, and 3 adapted to be connected and disconnected by the flow of oil traversing said couplings in the direction indicated by arrows. On the said transmission-shaft $a$ the cylindrical oil-distributor $b$ is loosely mounted, which can be turned about its axis by means of the gear $c$. In Fig. 1 the coupling 2 is shown connected, the two other couplings 1 and 3 being shown disconnected.

The distributor $b$ is mounted within the stationary casing $d$. In the outer surface of the distributor the channels $e$, $e^1$, and $e^2$ are provided (Fig. 2) corresponding to the oil-channels F, $F^1$ and $F^2$ of the three couplings 1, 2 and 3 respectively. The casing $d$ has an inlet $g$ and at the opposite side two outlets $h$, $h'$ (Fig. 5).

By the turning of the distributor $b$ within casing $d$ one of three channels $e$, $e^1$, $e^2$ can be made to register with the inlet $g$. Figs. 1 and 2 show channel $e$ in register with $g$. In this position the oil contained in the tank $p$ to which the oil is supplied by a pump (not shown) flows through the inlet $g$ into the channel $e$, which opens into a conduit $m$ leading to the coupling 2. The latter thereby is moved into operative position as shown in Fig. 1. The other two channels $e^1$ and $e^2$ being in communication with the outlets $h$ and $h^1$, (Fig. 5) the oil in these channels is free to escape, reaching the discharge opening $q$ (Fig. 1) through which the oil flows into a collecting tank (not shown) from which it is returned by a pump (not shown) to the tank $p$.

The distributor $b$ thus always admits oil only to one of the three couplings, the two other couplings being open to the outlets $h$, $h^1$. To avoid the necessity of cutting into the transmitting shaft $a$ four separate conduits, which are intended for the three couplings 1, 2, 3, shown in the drawing, the construction, preferably, is simplified by introducing into the hollow shaft $a$, a tube $k$, containing the required number of conduits. According to Fig. 3 being a cross-section along line C—D in Fig. 1, said tube is made of one integral piece. The modification illustrated in Fig. 4 shows a mantled tube 1 divided into four conduits $m$, $m^1$, $m^2$, $m^3$ which tube is introduced into the transmitting shaft $a$.

The distributor $b$, besides connecting the couplings, also serves to disconnect the same. For this purpose the casing $d$ and shaft $a$ are provided with a common inlet $n$, through which oil under pressure is admitted to one of the said conduits $m, m^1$, etc., to operate the differential pistons $o$, so as to disconnect the couplings. In the position of the parts shown in Fig. 1, oil under pressure is admitted to the conduit $m^1$ as indicated by the long arrow-lines, the oil disconnecting the couplings 1 and 3, coupling 2 being shown connected as above described.

All couplings are provided with apertures $r$ through which the oil contained in said couplings may escape.

What I claim is:

1. In a device for distributing fluid pressure to hydraulic couplings, the combination with the couplings and a transmission shaft carrying the same, of a distributing member, loosely mounted on the said shaft and having channels in its outer surface, conduits in communication with the said channels and leading to the various couplings, a stationary casing surrounding the said distributing member and having one inlet opening and a plurality of outlet openings adapted to register with the channels in the said distributing member to admit oil under pressure to any of the said couplings by means of the said conduits for connecting such coupling and to discharge the oil therefrom respectively, an oil tank, and means forming an escape for the oil returned from the said couplings.

2. A combination as set forth in claim 1, in which the said distributing member is provided with a gear for rotating the said member.

3. A combination as set forth in claim 1, in which the said transmission shaft is a hollow shaft containing a tube fitted into the shaft and divided into compartments forming the said conduits.

In testimony whereof I have hereunto affixed my signature in the presence of two witnesses.

FRITZ MAYER.

Witnesses:
 JOHN KELLER,
 MAX MÜLLER.